US010948877B2

(12) United States Patent
Hasedzic et al.

(10) Patent No.: US 10,948,877 B2
(45) Date of Patent: Mar. 16, 2021

(54) VEHICLE INFORMATION DISPLAY ASSEMBLY, SYSTEM AND METHOD

(71) Applicant: Jaguar Land Rover Limited, Coventry (GB)

(72) Inventors: Elvir Hasedzic, Coventry (GB); Javid Khan, Coventry (GB)

(73) Assignee: JAGUAR LAND ROVER LIMITED, Coventry (GB)

(*) Notice: Subject to any disclaimer, the term of this patent is extended or adjusted under 35 U.S.C. 154(b) by 240 days.

(21) Appl. No.: 15/736,712

(22) PCT Filed: Jun. 16, 2016

(86) PCT No.: PCT/EP2016/063924
§ 371 (c)(1),
(2) Date: Dec. 14, 2017

(87) PCT Pub. No.: WO2016/202939
PCT Pub. Date: Dec. 22, 2016

(65) Prior Publication Data
US 2018/0181067 A1 Jun. 28, 2018

(30) Foreign Application Priority Data
Jun. 16, 2015 (GB) ...................... 1510523

(51) Int. Cl.
*G03H 1/28* (2006.01)
*G03H 1/26* (2006.01)
(Continued)

(52) U.S. Cl.
CPC ........... *G03H 1/2645* (2013.01); *B60K 35/00* (2013.01); *B60Q 9/008* (2013.01); *B60R 1/12* (2013.01);
(Continued)

(58) Field of Classification Search
CPC .......... G03H 1/0005; G03H 1/02; G03H 1/08; G03H 1/22; G03H 1/157; G03H 1/265;
(Continued)

(56) References Cited

U.S. PATENT DOCUMENTS 4,447,128 A * 5/1984 Ferrer .................... G02B 27/01
349/11
2005/0002074 A1 1/2005 McPheters et al.
(Continued)

FOREIGN PATENT DOCUMENTS

EP 1 974 980 A1 10/2008
WO WO 2009/121380 A1 10/2009

OTHER PUBLICATIONS

Patents Act 1977: Combined Search and Examination Report under Sections 17 and 18(3), UKIPO Application No. GB1510523.2, dated Dec. 17, 2015, 8 pp.
(Continued)

*Primary Examiner* — Mustak Choudhury
(74) *Attorney, Agent, or Firm* — Miller Nash Graham & Dunn LLP

(57) ABSTRACT

A mirror and information image display assembly (300) for a vehicle, a holographic information image display system (300, 106, 104), a vehicle (100) comprising such an assembly, and a method of providing image information to an occupant of a vehicle are disclosed. The assembly has a reflective layer (302) and an image display means (304, 306), for displaying image information to an occupant of the vehicle. The image display means comprises a hologram (304), and a lighting means comprising a light source (306) for illuminating the hologram.

18 Claims, 7 Drawing Sheets

(51) Int. Cl.
*B60Q 9/00* (2006.01)
*B60R 1/12* (2006.01)
*G03H 1/02* (2006.01)
*G03H 1/22* (2006.01)
*B60K 35/00* (2006.01)
*G03H 1/08* (2006.01)

(52) U.S. Cl.
CPC ............... *G03H 1/02* (2013.01); *G03H 1/22* (2013.01); *G03H 1/2202* (2013.01); *B60K 2370/29* (2019.05); *B60K 2370/777* (2019.05); *B60R 2001/1215* (2013.01); *B60R 2300/8026* (2013.01); *G03H 1/08* (2013.01); *G03H 1/2294* (2013.01); *G03H 2001/2226* (2013.01); *G03H 2001/2231* (2013.01); *G03H 2001/2234* (2013.01); *G03H 2001/2255* (2013.01); *G03H 2001/2273* (2013.01); *G03H 2001/2284* (2013.01); *G03H 2210/30* (2013.01); *G03H 2223/16* (2013.01); *G03H 2227/06* (2013.01); *G03H 2250/42* (2013.01); *G03H 2260/62* (2013.01)

(58) Field of Classification Search
CPC .. G03H 1/2645; G03H 1/2202; G03H 1/2294; G03H 2001/2234; G03H 2001/2226; G03H 2250/42; G03H 2227/06; G03H 2223/16; G03H 2210/30; G03H 2001/2284; G03H 2001/2273; G03H 2001/2255; G03H 2001/2231; G03H 2001/2655; G03H 2001/266; G03H 2260/62; B60R 1/001; B60R 1/04; B60R 1/12; B60R 2001/1215; B60R 2001/1253; B60R 2001/1284; B60R 2300/8026; B60Q 9/008; B60K 35/00; B60K 2370/777; B60K 2370/29; G02B 27/0103; G02B 27/0172; G02B 27/4272; G02F 1/29; G02F 1/1533
USPC ....... 359/9, 24, 13, 489.08, 567, 633; 345/8, 345/633; 348/40, 148
See application file for complete search history.

(56) References Cited

U.S. PATENT DOCUMENTS

| | | |
|---|---|---|
| 2012/0262288 A1 | 10/2012 | Moussa et al. |
| 2013/0038935 A1* | 2/2013 | Moussa ............... G02B 5/32 359/567 |
| 2013/0093579 A1* | 4/2013 | Arnon ............... B60Q 1/2665 340/425.5 |

OTHER PUBLICATIONS

Patents Act 1977: Combined Search and Examination Report under Sections 17 and 18(3), UKIPO Application No. GB1610509.0, dated Jan. 17, 2017, 9 pp.

International Search Report and Written Opinion of the International Searching Authority, International Application No. PCT/EP2016/063924, dated Sep. 9, 2016, 17 pp.

Buckley et al., "Rear-view virtual image displays", PROC SID (Society for Information Display), *Vehicles and Photons: 16th Annual Symposium on Vehicle Displays*, Oct. 15, 2007, 5 pp. (accessed at http://bentecservices.com/pdf_files/vehicles_and_photons_2009_final.pdf).

Graham-Rowe, "Head-up Displays go Holographic", *MIT Technology Review*, Oct. 16, 2009, 6 pp. (accessed at https://www.technologyreview.com/s/415755/head-up-displays-go-holographic/).

* cited by examiner

VEHICLE INFORMATION DISPLAY ASSEMBLY, SYSTEM AND METHOD

RELATED APPLICATIONS

This application is a 35 U.S.C. § 371 national stage application of PCT Application No. PCT/EP2016/063924, filed on Jun. 16, 2016, which claims priority from Great Britain Patent Application No. 1510523.2, filed on Jun. 16, 2015, the contents of which are incorporated herein by reference in their entireties. The above-referenced PCT International Application was published in the English language as International Publication No. WO 2016/202939 A1 on Dec. 22, 2016.

TECHNICAL FIELD

The present disclosure relates to a vehicle information display assembly, system and method, and in particular, but not exclusively, to a mirror and information image display assembly for a vehicle. Aspects of the invention relate to an image display assembly, a holographic image display system, a method of displaying information to a vehicle occupant and to a vehicle incorporating such an assembly.

BACKGROUND

Vehicle information display systems are well known to the art. In particular, systems are known in which information is displayed to a driver of the vehicle, in addition to the information available on the vehicle dashboard. For example, information may be displayed in a head-up display. However, such head-up displays usually provide only two-dimensional or flat images, which are less immediately noticeable by the driver. In addition the images are usually displayed either on the windscreen or on a pop-up screen, and the focal plane for the images is either immediately in front of the driver or otherwise close to the driver, whereas the objects the driver should be observing through the windscreen are at far greater depths of field. This can affect reaction time if the driver is re-focussing to a depth of field in front of the vehicle from having viewed a head-up display image.

Many previously considered systems using head-up displays or other such driver displays are highly complex, requiring many different systems to work in concert, and some requiring moving parts to maintain the display.

In one different previously considered system, information is displayed to the driver on a wing mirror of the vehicle. The information relates to alerting the driver to an object, such as another vehicle, entering a blind spot area of the vehicle. In this system, a warning light is lit inside the wing mirror. The warning light is transmitted through an etching in the mirror surface, the etching being in the shape of an icon indicating to the driver information concerning the blind spot object. For example, the icon when lit may indicate to the driver that an object (a vehicle) is approaching from behind, in the blind spot.

One possible disadvantage to such a system may be that the icons etched in the mirror remove useable mirror space, thereby potentially restricting the view of the driver albeit by small amounts. Another is that different icons and images may require different areas on the mirror to be lit, using up further space. Another is that the icons are also lit directly from behind, and therefore the light may be seen directly by the driver, potentially causing discomfort. In addition, the blind spot icon viewed on the mirror is flat (two-dimensional), and requires the user to focus on the surface of the mirror, whereas the driver is usually focussed on objects reflected at a distance behind the vehicle, which are therefore behind the focal plane of the mirror perceived as a virtual image. The driver's eyes therefore need to re-focus each image in order to view them, hence, the accommodation reflex is longer and the eyes work harder.

The present invention has been devised to mitigate or overcome at least some of the above-mentioned problems.

SUMMARY OF THE INVENTION

Aspects and embodiments of the invention provide a mirror and information image display assembly for a vehicle, a holographic information image display system, a vehicle comprising such an assembly, and a method of providing image information to an occupant of a vehicle as claimed in the appended claims.

According to an aspect of the invention, there is provided a mirror and information image display assembly for a vehicle, the assembly comprising: a reflective surface; and image display means, for displaying image information to an occupant of the vehicle, the image display means comprising: a hologram; and lighting means comprising a light source for illuminating the hologram.

The use of a hologram in the display means with a reflective surface allows the hologram to be generated without interfering with the use of the reflective surface. When the lighting means is activated, the hologram is viewable, but when the lighting means is not activated, the hologram is not viewable, and there is no visible alteration or obscuration of the reflective surface. Therefore no mirror space or "real estate" is used up by the image display means.

Furthermore, as the lighting is indirect—it is the hologram which is being illuminated—the light can be prevented from being transmitted directly to the driver, preventing any potential distraction or discomfort.

In addition, use of a hologram in the display means provides a three-dimensional image to the occupant or driver, which means that the depth of field of the image can be used as a tool to aid perception of the image by the occupant or driver. For example depth of field of the image could be made to match the depth of field which the driver is typically focussed on during normal use of the mirror. In addition, the three-dimensional hologram image is more noticeable than a two-dimensional or flat image, for example because it will move as the driver's head or line of sight moves, and appear to change size as the driver moves towards or away from the hologram.

The image display means may be juxtaposed with the reflective layer.

The image display means may be disposed in front of the reflective layer.

The hologram may form a hologram layer. The image display means may comprise a glass layer which is disposed between the hologram layer and the reflective layer. In this embodiment, the glass layer is disposed between the hologram layer and the reflective layer. Alternatively, the image display means comprises a glass layer which is disposed in front of the hologram layer. In this embodiment, the hologram layer is disposed between the glass layer and the reflective layer.

The glass layer may be a wedged glass layer.

According to another aspect of the invention, there is provided an information image display assembly for a vehicle, the assembly comprising: a reflective surface; and image display means, for displaying image information to an occupant of the vehicle, the image display means comprising: a hologram; and lighting means comprising a light source for illuminating the hologram.

In an embodiment, the reflective layer is at least partially transmissive, and the image display means is disposed behind the reflective layer.

The reflective layer may comprise a reflective surface which may be a mirrored surface, or silvered surface. The reflective nature of the surface is sufficient for reflecting light from objects around a vehicle to an occupant of the vehicle. The reflective layer may also be at least partially transmissive, whilst remaining sufficiently reflective. The transmissive nature of the surface is sufficient for light from the hologram to be viewable by an occupant of the vehicle.

The hologram may be etched into a substrate. The occupant may be a driver, or a passenger of the vehicle.

In an embodiment, the image display means comprises a plurality of holograms. Optionally, the plurality of holograms are multiplexed.

As the hologram can be multiplexed, different (holographic) images can be displayed using the same amount of useable space on the mirror, rather than using separate areas of the mirror.

In embodiments, the plurality of multiplexed holograms are one of: wavelength-multiplexed holograms; angular-multiplexed holograms; spatially-multiplexed holograms; edge-dependent-multiplexed holograms and phase-multiplexed holograms. In embodiments, the plurality of multiplexed holograms differ by one of the following features of the hologram image produced: viewing angle; focal depth; colour; image size and image content.

Optionally, the plurality of multiplexed holograms differ by image content of the hologram image produced, and the image content of the plurality of multiplexed holograms is sequenceable into an animation. The holograms or holographic images produced may be temporally and/or spatially sequenceable.

Light from the light source may be transmitted from an edge of the glass layer and propagrated through the glass layer to light the hologram.

In another embodiment, the hologram is an edge-lit hologram, and light from the light source is transmitted from the edge of the hologram, and propagated from the hologram through the at least partially transmissive reflective layer.

This allows the holographic arrangement to save space inside the mirror assembly.

In an embodiment, the image display means is configured to be controlled using an input signal from a sensor on the vehicle. Optionally, the image display means is configured to be controlled using the input signal in response to an object detected by the sensor in a blind spot of the vehicle, and the image information is information indicative of a proximity of the object to the vehicle.

In an embodiment, the plurality of multiplexed holograms differ by focal depth of the image of the hologram image produced, and the holograms differ in focal depth in relation to the proximity of the object to the vehicle.

This allows for the occupant's focus changing as the object approaches.

According to another aspect of the invention, there is provided an image display means for an assembly according to any of the above described aspects and embodiments, the image display means being for displaying image information to an occupant of the vehicle, and comprising: a hologram; and lighting means comprising a light source for illuminating the hologram.

According to yet another aspect of the invention, there is provided a holographic information image display system, comprising: an assembly according to any of the above described aspects and embodiments; a processor for controlling the image display means; and a sensor configured to be mounted on the vehicle for providing sensor inputs to the processor.

According to still another aspect of the invention, there is provided a vehicle comprising an assembly according to any of the above described aspects and embodiments.

According to a further aspect of the invention, there is provided a vehicle comprising an image display means according to the above described yet another aspect and embodiments or a holographic information image display system according to the above described yet another aspect.

According to a further aspect of the invention, there is provided a method of providing image information to an occupant of a vehicle, comprising: obtaining a first input signal from a sensor on the vehicle indicating a first proximity of an object to the vehicle; obtaining a second input signal from the sensor indicating a second proximity of the object; using the sensor input signals to control an image display means of an assembly according to the aspects and embodiments described above, by illuminating a first of the plurality of holograms in response to the first sensor input signal; and illuminating a second of the plurality of holograms in response to the second sensor input signal.

Optionally, said image display means of the assembly is an image display system, comprising the hologram and the lighting means, configured to display image information to an occupant of the vehicle; wherein the lighting means comprises a lighting device comprising a light source for illuminating the hologram; wherein the system comprises: the processor for controlling the image display system, the processor comprising: an electrical input for receiving sensor input signals from the sensor; and an electrical output for sending control signals to the image display assembly; and an electronic memory device electrically coupled to the electronic processor and having instructions stored therein; and wherein control of the image display system comprises the processor being configured to access the memory device and execute the instructions stored therein such that it is operable to control the image display system.

According to a yet further aspect of the invention, there is provided an assembly, system, vehicle or method substantially as herein described with reference to the accompanying figures.

According to a still further aspect of the invention, there is provided a mirror and information image display assembly for a vehicle, the assembly comprising: a reflective layer; and an image display system, for displaying image information to an occupant of the vehicle, the image display system comprising: a hologram; and lighting device comprising a light source for illuminating the hologram.

Further aspects of the invention comprise computer program applications or computer readable media comprising computer program code adapted, when loaded into or run on a computer or processor, to cause the computer or processor to become a processor of a system according to the aspects described above, or to carry out a method according to the aspects described above.

Processors and/or controllers may comprise one or more computational processors, and/or control elements having one or more electronic processors. Uses of the term "processor" or "controller" herein should therefore be considered to refer either to a single processor, controller or control element, or to pluralities of the same; which pluralities may operate in concert to provide the functions described. Furthermore, individual and/or separate functions of the processor(s) or controller(s) may be hosted by or undertaken in different control units, processors or controllers.

To configure a processor or controller, a suitable set of instructions may be provided which, when executed, cause said control unit or computational device to implement the techniques specified herein. The set of instructions may suitably be embedded in said one or more electronic processors. Alternatively, the set of instructions may be provided as software to be executed on said computational device.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 3b is a diagram illustrating a second view of the mirror and information image display assembly illustrated by FIG. 3a.

DETAILED DESCRIPTION

Embodiments of the invention provide improved means and systems for presenting image information to the driver of a vehicle. Embodiments of the invention provide a hologram and an (optionally coherent) illumination source as the means of generating an image, thereby providing a number of advantages over previously considered systems. In particular embodiments, these advantages are particularly useful where the image information seeks to alert the driver to a potential hazard, such as in a blind spot warning system.

For example, by replacing the previously considered system's directly lit etched wing mirror icons with a hologram, the system can provide more information, richer and larger icons, and even more detail of an overtaking vehicle's distance, all in the driver's eye line. The image is also three-dimensional, allowing a choice of depth of field for the image, for example, in front of the plane of the mirror, or matching the depth of field of the vehicle's blind spot. Since the image is holographic and therefore three-dimensional, the image will also appear to move, and also to vary in size as the driver moves towards and away from the hologram.

Such a holographic system can provide a striking and larger image. In one embodiment, an LED light behind the mirror glass illuminates minute nano-structures etched onto a glass substrate forming the hologram, to provide a striking 25 mm image. This image is projected only when the system detects a vehicle overtaking or undertaking. The size and boldness of the image means it is easier for the driver to see in his peripheral vision. By giving the driver better information these systems can aid the driver in making smarter and faster driving decisions, thereby improving safety.

Figure 1:
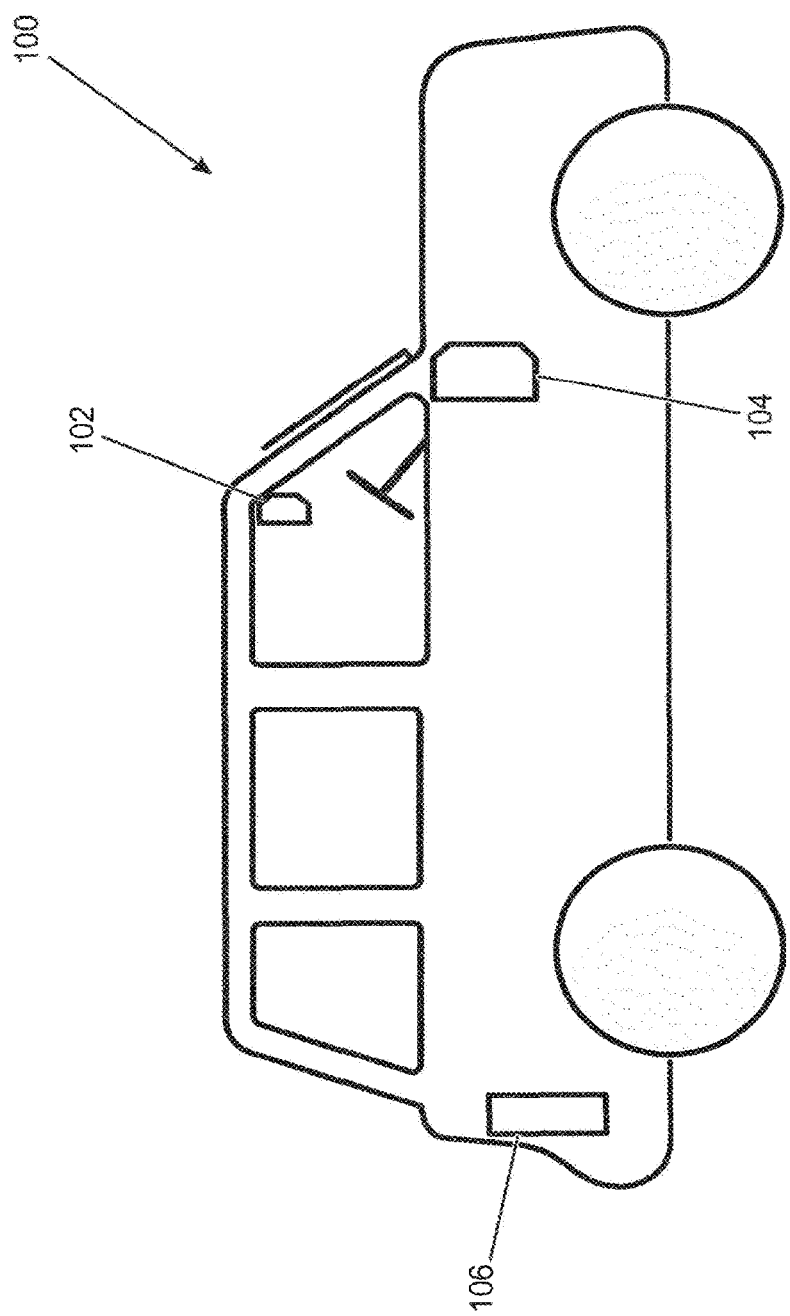
FIG. 1 is a diagram illustrating a vehicle and holographic information display system according to an embodiment of the invention.

Referring initially to FIG. 1, this is a diagram illustrating a vehicle and holographic information display system according to an embodiment of the invention. A common road-going motor vehicle (100) comprises the usual features including wing mirrors (104) and a rear view mirror (102). Other mirror features may be used on such a vehicle, or on other types of vehicle; for example larger vehicles include additional mirrors. Typically all such mirrors aim to provide an additional view or line of sight to the driver of the vehicle, which view is either not accessible to the driver when in the driving seat, or not viewable without moving the driver's position, or the driver turning around, or not easily viewed without taking the driver's eyes off the road.

The vehicle illustrated here also incorporates a sensor (106) disposed at a low rear side of the vehicle, above and to the rear of the wheel arch, which can be used for detecting objects approaching the vehicle. In embodiments of the invention, this is used in detecting objects, such as approaching cars, in the blind spot of the vehicle, i.e. the area slightly off and to the rear of the vehicle which cannot be seen by either the rear view mirror, the wing mirror or the driver's front-facing viewpoint. Such sensors could be used for detection of different objects or potential hazards, and could be mounted elsewhere on the vehicle, and could include a set or an array of such sensors. For example, a sensor positioned either as shown in FIG. 1 or along the side of the vehicle may be used to detect the proximity of an obstruction which the vehicle is attempting to pass, such as a narrow alley. This sensor input can be used to provide images on the mirrors warning how close the obstruction is. Other such sensors can for example provide parking aid information, or information as to whether a road or area viewed in the mirror is clear.

Systems of embodiments of the invention may also be used for different positions of the mirrors. For example, a wing mirror which can be set at different angles can provide different information at the different angles. For example, a mirror assembly retracted during passing an obstruction can provide image information regarding the obstruction proximity, and revert to providing blind spot images in the normal deployed position.

Figure 2:
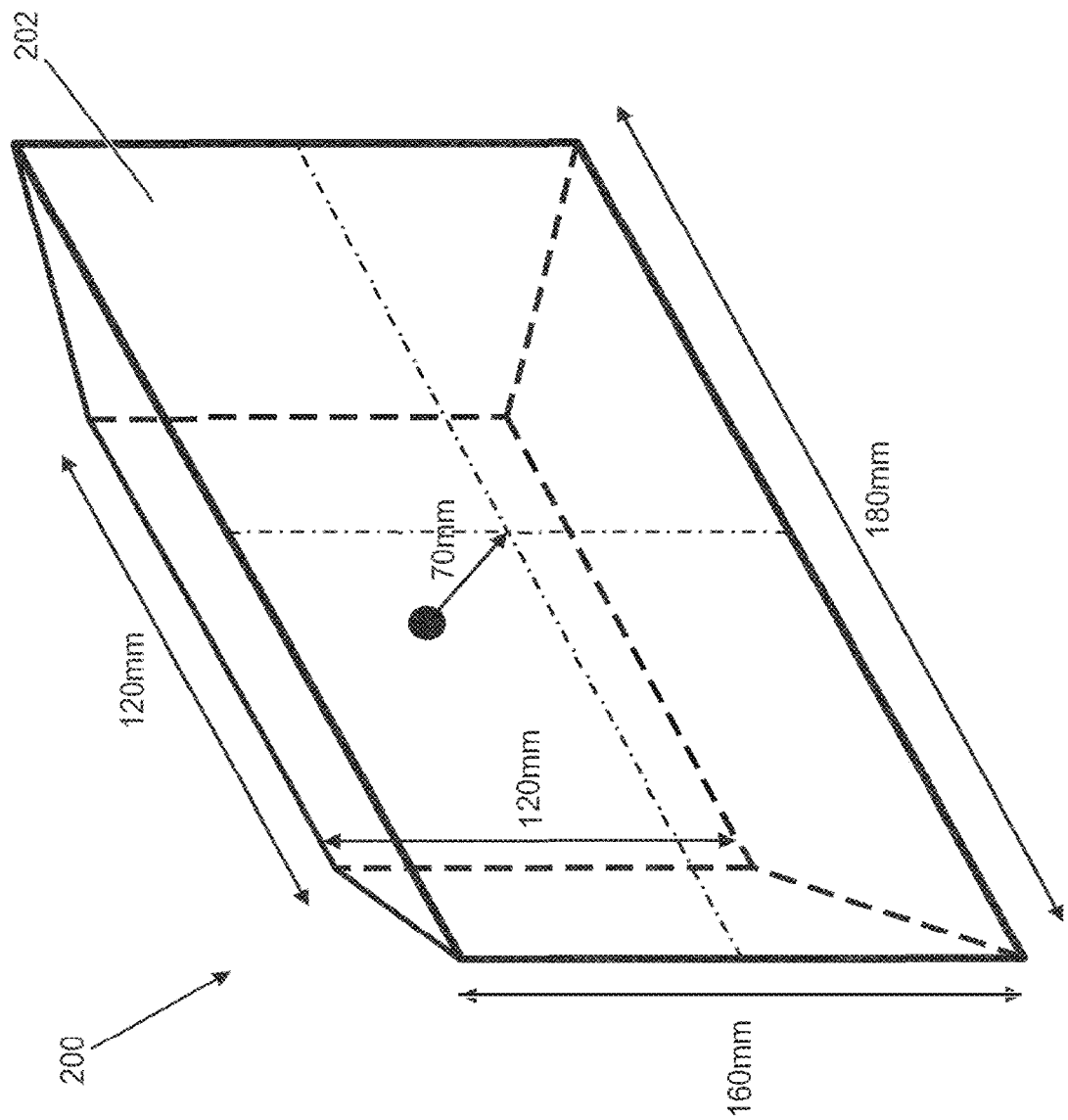
FIG. 2 is a diagram illustrating a mirror cavity for an information display system according to an embodiment of the invention.

FIG. 2 is a diagram illustrating a mirror cavity (200) for an information display system according to an embodiment of the invention. The cavity illustrated is a typical size for a wing mirror cavity for a motor vehicle—cavities for other types of mirrors, and for other types of vehicle will vary. Here, the cavity has a front surface 202, which will either abut or be formed by the mirror. The cavity width at the front surface is around 180 mm, the height around 160 mm, and the depth from front to rear in the centre around 70 mm. The edges of the cavity recess towards the rear surface, where the height and width are both around 120 mm. This cavity area is the space available in which to house the usual electronics for controlling the mirror, and in addition accommodating the driver information display system comprising the hologram and lighting system.

Figure 3A:
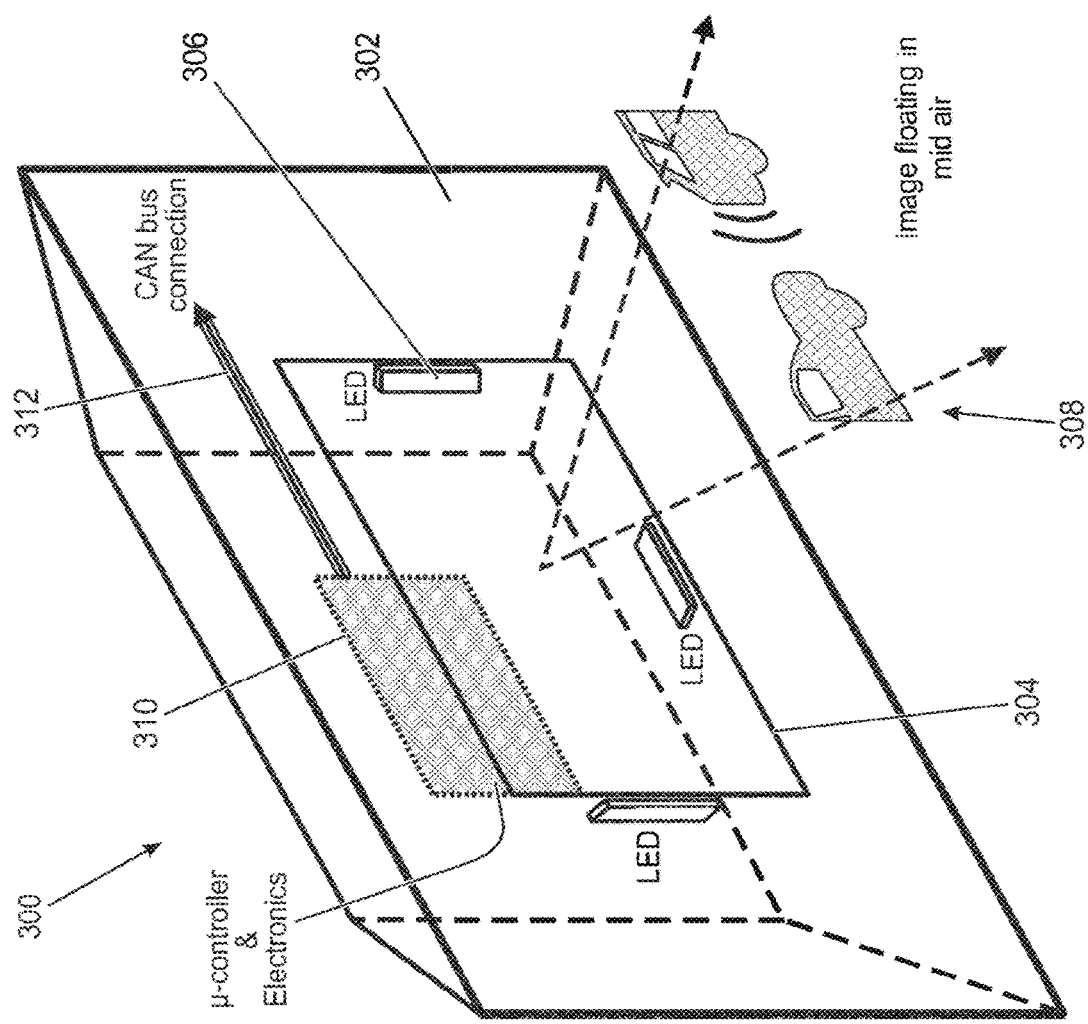
FIG. 3a is a diagram illustrating a first view of mirror and information image display assembly according to an embodiment of the invention.

FIG. 3a is a diagram illustrating a first view of a mirror and information image display assembly according to an embodiment of the invention. The assembly (300) has a reflective layer (302), which in embodiments is at least partially transmissive. This allows light from the illuminated hologram, behind the reflective layer, to pass through the so that it can be viewed by the driver. The reflective layer however still performs the usual function of a rear-view or wing mirror as a mirrored surface. The reflective layer in this embodiment is made of glass, but could be formed from other composites or materials. The reflective layer itself in this embodiment is achieved by a mirrored or silvered film coating on the glass sheet.

Figure 3B:
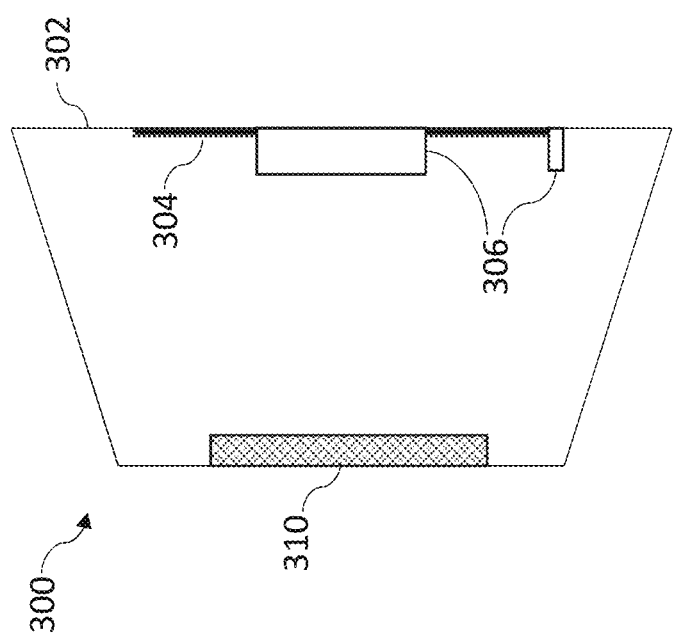

FIG. 3b is a diagram illustrating a second view of the mirror and information image display assembly 300 illustrated by FIG. 3a, in which the hologram 304 is behind the front surface 302. It will be appreciated that FIG. 3b is essentially a cross-sectional view of the mirror and information image display assembly 300.

The assembly also has image display means (304, 306, 310), for displaying image information to the driver. The first part of this display means is the hologram (304) mounted on the rear surface of the reflective layer. The hologram is, as is known to the art, an interference or diffraction pattern generated so that when illuminated appropriately, it generates or displays a three-dimensional image.

Diffraction occurs when light hits a nano-structure that is of a similar size to the wavelength of that light. Through careful placement of these nano-structures, it is possible to manipulate the light to behave in different ways, for example producing images that appear to be in mid-air. The light behind the mirror glass (in this embodiment a "hidden" LED) beams onto the nano-scale holographic structures that are etched in the inside surface of the glass, creating diffractions of light. Each pixel of the image is created by a combination of the surface diffractions that takes place after the (LED) light hits the diffraction pattern nano-structures.

Diffraction patterns are traditionally generated using a split source of coherent light (e.g. a laser), with one beam reflecting light from the object to be imaged, the other used as a reference beam, and the interference pattern between the reference beam and the object-scattered light being used to form the hologram diffraction pattern. In this embodiment, the diffraction pattern is computer generated; the source, light splitting, reflections and interference are generated artificially, as if the object were present.

In embodiments, the pattern is etched onto a substrate, in this embodiment a sheet of glass. In one embodiment as shown in FIG. 3a, the hologram is etched directly onto the rear of the glass surface the front of which is mirrored to form the reflective layer (302) of the assembly. In another embodiment, the hologram is etched onto a substrate which is then mounted onto the rear of the reflective layer sheet. In other embodiments, the hologram sheet is mounted behind but at a distance from the reflective layer sheet.

In embodiments, mass production of the hologram sheet may be by laser copying, or by embossing.

In an alternative embodiment, the hologram substrate can be mounted on the front of the reflective layer, so that the illumination light passes through the reflective layer and then onto the hologram. This means that the hologram need not necessarily be housed inside the assembly behind the reflective layer.

The assembly also has a lighting means (306, 310) for illuminating the hologram. In the embodiment in FIG. 3a, the hologram is edge-lit, meaning that the hologram receives light through the edge of the medium on which the hologram is formed, and the incident light is then diffracted by the hologram through a front surface of the hologram, and then out through the reflective layer. FIG. 3a illustrates a set of edge-lit light sources (306), one on each of three different side edges of the rectangular hologram medium. In order to activate a hologram, light sources must usually be coherent light sources, and in most cases monochromatic. Traditionally, monochromatic lasers are used. Here however, the light sources are LEDs, producing incoherent light. The LED output is then collimated to produce less divergent light to illuminate the hologram, to help mitigate or reduce any blurring effect created by the use of incoherent rather than coherent light.

The illumination of the hologram produces the hologram image (308), which in the embodiment shown appears to float in mid-air in front of the plane of the mirror assembly. This is because for the computer generated object that forms the computer generated hologram (CGH), effectively any depth of field can be chosen for the three-dimensional object image seen in illuminating the hologram. Therefore the object can be chosen to appear to be far behind the plane of the hologram, or somewhat in front. The focal point of the hologram can therefore be chosen—the point at which the object is in focus (for the driver's viewpoint) can be chosen to be behind or in front of the mirror. For a focal point behind the mirror, this can for example be chosen to be a similar distance to that between the mirror and the blind spot of a vehicle, so that the driver's focus does not need to change much, if at all, when looking between an object in the mirror near the blind spot, and the image projected by the hologram in the mirror.

In an alternative embodiment to that illustrated in FIG. 3a, the hologram is a transmission hologram. Here light from the light source is transmitted from behind the hologram, and propagated from the hologram through the transmissive reflective layer. The light can be produced similarly from collimated LEDs, this time situated behind the hologram. This (and other) arrangement(s) may require narrowband LEDs (<10 nm) with wide-throw optics to illuminate the entire surface of the hologram, and may also require dichroic filters to improve the quality of the light output.

In another alternative, the hologram may be a front-lit reflection hologram—this requires lighting from the front, for example, by such LED light sources mounted in the edges of the mirror housing in front of the mirror.

The lighting system is electronically controlled. In this embodiment, this is performed by a micro-controller and accompanying electronics (310) mounted at the back of the assembly, behind the hologram sheet. These electronics are connected to the vehicle's communication and control systems, here a CAN bus connection (312).

The method for creating the hologram, such as etching onto a glass sheet, can be used for embedding several interference patterns, each of which reconstructing a unique/separate holographic image when it is appropriately illuminated. In one embodiment these holograms are physically separate, in separate areas of the hologram sheet or substrate, so that they can be illuminated in separate areas, and appear (to the driver) in separate areas on the reflective layer.

In another embodiment, the different interference patterns are overlaid on one another, or multiplexed. Each individual overlaid hologram can only be viewed when the particular type of light for illuminating only that hologram is used. For example, the multiplexed holograms may for example be either spatially multiplexed or angularly multiplexed. Angular multiplexed holograms can reconstruct a different image, depending on the location of the illumination source, and hence the angle of illumination of the hologram. Spatially multiplexed holograms can reconstruct a different image depending on structured illumination of the source. Holograms can also be multiplexed according to the wavelength of the illumination light, or by the phase of the illumination light. For example, a red LED may illuminate a first multiplexed hologram, and a green LED a second.

Edge-multiplexed holograms can reconstruct different images when different edges of the holographic screen are illuminated. This technique is used in the embodiment shown in FIG. 3a, though this arrangement may also be used for other types of multiplexing. For example the three LEDs 306 can be chosen to be different wavelengths, or output light at different phases.

The different images produced by the different (and/or multiplexed) holograms can differ in various ways. Simply, the holograms can show different images completely or different colour images. The different images may be different sizes or shapes. Since the hologram's focal depth can be made to vary, the focal depths of the different holograms on the assembly can be varied. For example, an image alerting the user to an object detected at a far distance may have a long focal depth, and an image alerting the user to a near object, a close focal depth, in order that the focal depths of the alert images are more closely aligned to the focal depths of the objects as viewed in the mirror. Similarly, as an object is detected as getting closer, the size of the holographic image produced can be increased, by multiplexing different sizes of image.

The holograms can be made for different viewing angles. For example, in the case of a mirror which is retracted showing a different image from the usual system when the mirror is deployed, the different images for the two situations may be multiplexed, the image for the retracted mirror case having a shallow viewing angle in order to still be viewable by the driver when the mirror is retracted.

In one embodiment, the hologram (304) sheet contains different and/or multiplexed holograms which can be illuminated in sequence to give an animation effect.

If required, more than one lighting system can be used to illuminate different types of holograms in different ways, if more than one difference is required to be used. The different and/or multiplexed holograms can also be used in different ways. For example, one hologram or set of holograms could be used for stationary alerts, and another for alerts when the car is moving, for example on a highway or motorway. The stationary holograms might use different effects to those while driving—for example, the stationary holograms might alert the driver using a colour system, whereas while driving a focal depth difference may be more effective.

Another advantage of the use of a system such as that illustrated in FIG. 3a, is that it is extremely simple, and does not require moving parts to generate the holographic image. All that is required is the hologram, which is fixed (and therefore does not itself require alteration to produce different images or effects) and the illumination means, though this will usually require electronic control.

In an alternative embodiment, where complexity or computing power is not a concern, the hologram sheet (304) can be replaced by a spatial light modulator. This can therefore re-produce a computer generated hologram interference pattern to be lit by the illumination to produce the holographic image, but can also be changed to produce different holograms at different times for different situations. This represents an alternative to using multiplexed (fixed) holograms.

In embodiments such as that shown in FIG. 3a, the normal movement of a mirror assembly, such as a wing mirror, by the driver to alter the field of view, will not affect the hologram, as the lighting means (306) is coupled to the hologram (304) and/or to the front surface 302, and therefore the lighting angle will be maintained. However, in other embodiments where the lighting is not so coupled, perhaps for a transmission hologram, the lighting means will be required to change position or angle in concert with the movement of the mirror surface. This can be achieved by mounting the lighting on a structure which moves with the front surface 302, but is disposed towards the rear of the mirror cavity.

FIG. 4 is a diagram illustrating examples of images for a driver information display according to an embodiment of the invention. This system gives a gradual warning to the driver of the host vehicle of a vehicle approaching from the rear where that rear vehicle may approach and enter the blind spot of the host vehicle.

In order to provide a better means of warning the driver of the state of the blind spot, the system determines the distance of a rear vehicle (for example via sensor 106 in FIG. 1) and displays the distance of the vehicle behind when the rear vehicle approaches and is in the blind spot.

Figure 4A:
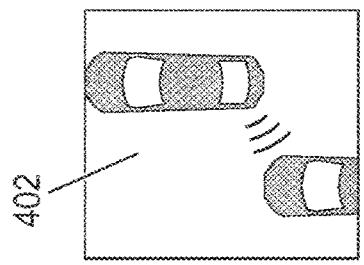
FIGS. 4a and 4b are diagrams illustrating examples of images for a holographic information display according to an embodiment of the invention.
Figure 4A:
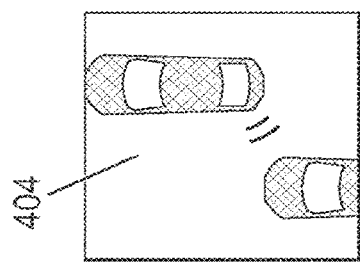
Figure 4A:
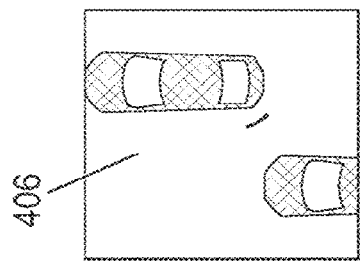

The hologram images in this embodiment are three icons as shown in FIG. 4a, indicating near (402), medium (404) and far (406) distances. The distances may for example be 10-15 m or 15-20 m away for "far", 5-10 m or 5-15 m for "medium", and 0-5 m for "near". The holograms for these images can either be side-by-side and lit separately, or in this embodiment multiplexed holograms, so that the icon appears only to change colour and appearance, rather than position. The icons change colour from yellow (406), orange (404) and finally to red (402) to help the driver understand how close the vehicle is behind. In one embodiment, the colour can be changed by lighting with the same lighting system and choosing different colours from the same system, with the holograms multiplexed (for example) by a method other than wavelength multiplexing (e.g. phase multiplexed). In another embodiment, the multiplexing can be by wavelength, and the three colours chosen as three different wavelengths, so that the illumination by three separate wavelength sources changes the colour and also the hologram (of the three or more overlaid) which is lit.

In another embodiment, at lower speeds (below 30 mph) the system is configured to use the "near" option only (i.e. red). At speeds above 30 mph however, the system in this embodiment reverts to using all three colours.

In another embodiment, the holograms are multiplexed edge-wise, so that the one of the LEDs (306 in FIG. 3a) chosen selects the hologram to be illuminated. The colours can be different from the different LEDs, but this does not affect the multiplexing in this case.

In the embodiment shown in FIG. 4, the blind spot system monitors vehicles behind the host vehicle. If the rear vehicles are at or above a threshold (time and or distance) the blind spot system does not display anything. If the approaching vehicle is within a distance of d1 from the blind spot of the host vehicle, the blind spot monitoring device moves to state one (far). If the approaching vehicle is within a distance of d2 (d2<d1) of the blind spot of the car, the blind spot monitoring device moves to state two (medium). If the approaching vehicle is inside the host vehicle's blind spot the blind spot monitoring device moves to state three (near). States one, two and three are colour coded.

Figure 4B:
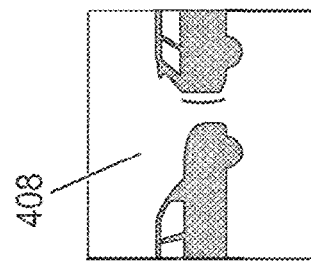
Figure 4B:
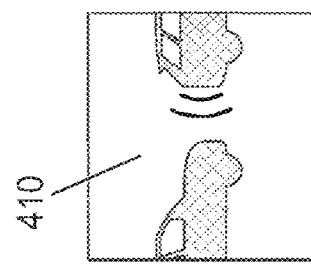
Figure 4B:
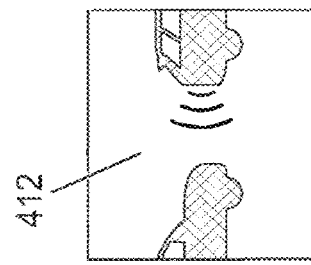

FIG. 4b illustrates an alternative set of images (408, 410, 412) which could be used for the driver information output to indicate near, medium and far distances/times.

In a specific embodiment, the details of the holograms are as follows:

| Hologram image dimensions (lateral XY) | 25 × 25 mm | Near |
|---|---|---|
| | 23 × 23 mm | Medium |
| | 20 × 20 mm | Far |
| Hologram Image depths (Z) | 20 mm | Near |
| | 15 mm | Medium |
| | 10 mm | Far |

Optionally, the hologram image tilt is 25 degrees, the illumination is by RGB LEDs, and the brightness range is between 1 to 50 lumens.

In embodiments generally, the hologram lighting brightness can be configured to change according to the ambient lighting conditions. This information is received from a vehicle's on-board lighting sensor.

Figure 5:
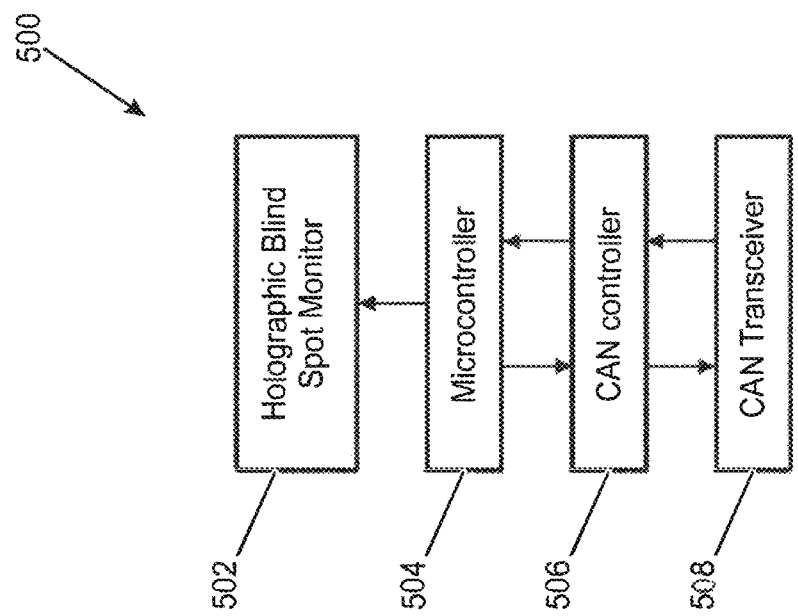
FIG. 5 is a diagram illustrating an example of components of a holographic information image display system according to an embodiment of the invention.

FIG. 5 is a diagram illustrating an example of components (500) of a holographic information image display system according to an embodiment of the invention. Here the holographic blind spot monitor system (the hologram and lighting system of FIG. 3a, or the assembly (300) in conjunction with the sensor (106) and other vehicle systems required) is connected to a microcontroller 504, such as that shown in FIG. 3a. This microcontroller is connected to a CAN controller (506) which is connected to a CAN transceiver (508). The CAN bus and system is typically implemented in road vehicle control systems—other electronic control systems could be used to produce the same features.

Figure 6A:
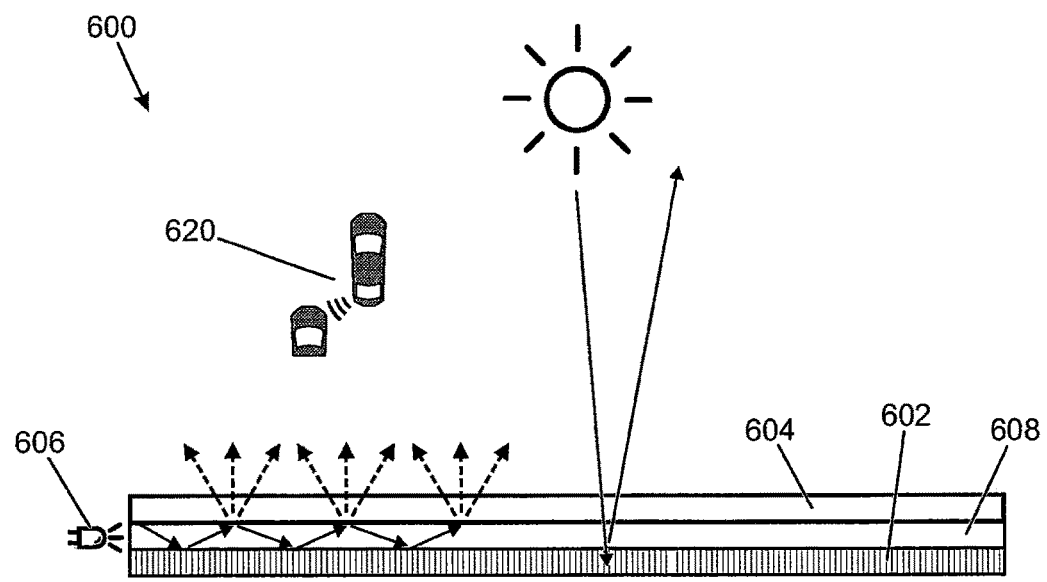
FIG. 6a is a diagram illustrating a mirror and information image display assembly according to another embodiment of the invention.

FIG. 6a is a diagram illustrating a mirror and information image display assembly according to another embodiment of the invention. The assembly (600) has a reflective layer (602). The reflective layer (602) performs the usual function of a rear-view or wing mirror. The reflective layer in this embodiment is made of glass, but could be formed from other composites or materials. The reflective layer itself in this embodiment is achieved by a mirrored or silvered film coating on the glass sheet.

The assembly (600) has an image display means for displaying image information to the driver. The image display means comprises a hologram layer (604), a glass layer (608) and lighting means (606). The hologram layer (604) is a transmission hologram and provides an external surface. The hologram layer is a pattern etched on a substrate as described above. The image display means is disposed in front of the reflective layer (602). The glass layer (608) is disposed between the reflective layer (602) and the hologram layer (604). The glass layer (608) provides a channel into which light can be emitted. In an embodiment, the glass layer is wedged. The wedged shape of the glass provides a mechanism for the light to illuminate in a more uniform manner extending to the spread of the wedged glass layer by distributing the light substantially equally. Such a layered structure having the light traveled through a layer of the structure allows the use of whole surface of the mirror. Such a layered structure provides total internal reflection of the light. The lighting means (606) comprises a light source capable of producing a specific light wavelength such as LED or LASER.

A holographic image (620) is produced in the mid-air when a light source is active to emit a specific light wavelength through the glass.

Figure 6B:
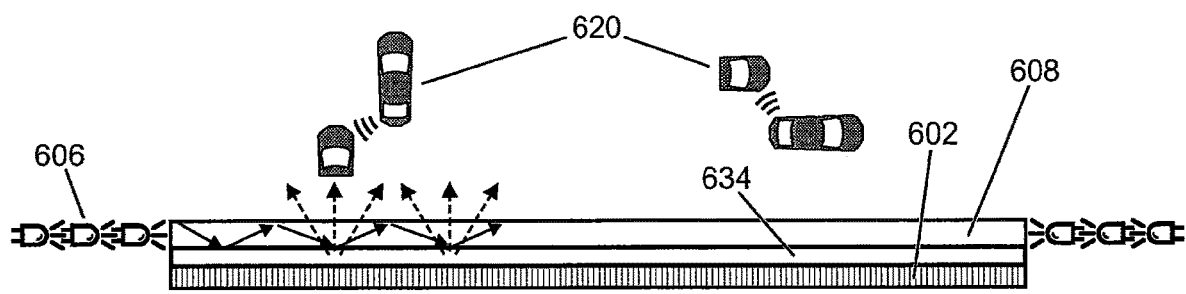
FIG. 6b is a diagram illustrating a mirror and information image display assembly according to another embodiment of the invention.

In an alternative embodiment, a glass layer (608) is located on top of the hologram layer (634) providing an external surface as shown in FIG. 6b. In such case, the hologram layer (634) is disposed between the reflective layer (602) and the glass layer (608). In this embodiment the hologram layer (634) uses Bragg grating so that the recording angle of reflection hologram is the same as the critical angle of waveguide for the total internal reflection in glass. The hologram layer (634) is a reflection hologram. A plurality of light source emits the light with specific wavelengths through the glass layer (608). For an example, a multiple LED lights are used. Then multiple images (620) corresponding to each of the wavelengths as emitted by different LEDs are produced. The plurality of light source is positioned at the edge of the glass layer (608). As described above the glass layer (608) may be wedged.

The embodiments of FIGS. 6a and 6b allow the use of conventional mirror, onto which two additional layers such as a glass and a holographical structure layers are disposed. By allowing the light to travel through the glass layer itself it is possible to use the whole surface of the mirror.

The control systems for the image display means and communication between these and the vehicle systems can be implemented with suitable computing and communication devices such as microprocessors, buses, and memory devices with software for controlling the systems, such as for switching the lighting means in response to sensor signals.

The computing devices may include one or more of logic arrays, memories, analogue circuits, digital circuits, software, firmware and processors. The hardware and firmware components of the devices may include various specialized units, circuits, software and interfaces for providing the functionality and features described herein.

An exemplary device may have a processor coupled to a memory, storage, and a network interface. The processor may be or include one or more microprocessors, application specific integrated circuits (ASICs), programmable logic devices (PLDs) and programmable logic arrays (PLAs).

The memory may be or include RAM, ROM, DRAM, SRAM and MRAM, and may include firmware, such as static data or fixed instructions, BIOS, system functions, configuration data, and other routines used during the operation of the computing devices. The memory can also provide a storage area for data and instructions associated with applications and data handled by processors.

The storage may provide non-volatile, bulk or long term storage of data or instructions for any computing devices. The storage may take the form of a solid state storage device, or a disk, tape, CD, DVD, or other reasonably high capacity addressable or serial storage medium. Multiple storage devices may be provided. Some of these storage devices may be external to any computing device, such as network storage or cloud-based storage.

Many modifications may be made to the above examples without departing from the scope of the present invention as defined in the accompanying claims.

The invention claimed is:

1. A mirror and information image display assembly for a vehicle, the assembly comprising:
   a reflective layer; and
   an image display system configured to display image information to an occupant of the vehicle,
   the image display system comprising:
   a plurality of holograms; and
   a light source for illuminating the holograms,
   wherein the holograms are located behind the reflective layer and the reflective layer is at least partially transmissive to allow light from the illuminated holograms to pass therethrough so that in use light from the illuminated holograms can be viewed by a driver of the vehicle, and wherein the holograms differ by focal depth and perceived size of a holographic image produced when illuminated.

2. The assembly according to claim 1, wherein the hologram forms a hologram layer, and the image display system comprises a glass layer which is disposed either between the hologram layer and the reflective layer or in front of the hologram layer.

3. The assembly according to claim 2, wherein the glass layer is a wedged glass layer.

4. The assembly according to claim 2, wherein light from the light source is transmitted from an edge of the glass layer, and propagated through the glass layer to light the hologram.

5. The assembly according to claim 1, wherein the reflective layer is at least partially transmissive, and wherein the image display system is disposed behind the reflective layer.

6. The assembly according to claim 5, wherein the hologram is an edge-lit hologram, and wherein light from the light source is transmitted from an edge of the hologram, and propagated from the hologram through the at least partially transmissive reflective layer.

7. The assembly according to claim 1, wherein the hologram is etched into a substrate.

8. The assembly according to claim 1, wherein the plurality of holograms are multiplexed.

9. The assembly according to claim 8, wherein the plurality of multiplexed holograms are one of: wavelength-multiplexed holograms, angular-multiplexed holograms, spatially-multiplexed holograms, edge-multiplexed holograms, or phase-multiplexed holograms.

10. The assembly according to claim 8, wherein the plurality of multiplexed holograms further differ by one of the following features of a hologram image produced: viewing angle, focal depth, color, or image content.

11. The assembly according to claim 10, wherein the plurality of multiplexed holograms differ by the image content of the hologram image produced, and wherein the image content of the plurality of multiplexed hologram is sequenceable into an animation.

12. The assembly according to claim 1, wherein the image display system is controlled using an input signal from a sensor on the vehicle.

13. The assembly according to claim 12, wherein the image display system is controlled using the input signal in response to an object detected by the sensor in a blind spot of the vehicle, and wherein image information in the hologram is information indicative of a proximity of the object to the vehicle.

14. The assembly according to claim 13, wherein the image display system comprises a plurality of multiplexed holograms which differ by focal depth of an image of a holographic image produced, and wherein the holographic image differ in focal depth in relation to the proximity of the object to the vehicle.

15. A vehicle comprising the assembly according to claim 1.

16. A holographic information image display assembly for a vehicle, comprising:
   a reflective layer; and
   an image display system configured to display image information to an occupant of the vehicle, wherein the image display system comprises a plurality of holograms and a light source for illuminating the holograms, wherein the holograms are located behind the reflective layer and the reflective layer is at least partially transmissive to allow light from the illuminated holograms to pass therethrough so that in use light from the illuminated holograms can be viewed by a driver of the vehicle, and wherein the holograms differ by focal depth and perceived size of a holographic image produced when illuminated;
   a processor for controlling the image display system; and
   a sensor configured to be mounted on the vehicle, for providing sensor inputs to the processor.

17. The holographic information display assembly according to claim 16, further comprising:
   an electronic memory device electrically coupled to the processor and having instructions stored therein, wherein the processor is configured to access the memory device and execute the instructions stored therein to control the image display system; and
   wherein the processor comprises an electrical input for receiving sensor input signals from the sensor, and an electrical output for sending control signals to the image display assembly.

18. A method of providing image information to an occupant of a vehicle, the method comprising:
   obtaining a first input signal from a sensor on the vehicle indicating a first proximity of an object to the vehicle;
   obtaining a second input signal from the sensor indicating a second proximity of the object; and
   controlling an image display system to illuminate a first of a plurality of holograms in response to the first sensor input signal and to illuminate a second of the plurality of holograms in response to the second sensor input signal,
   wherein the plurality of holograms differ by focal depth and perceived size of a holographic image produced when illuminated.

* * * * *